Patented June 10, 1952

2,600,354

UNITED STATES PATENT OFFICE 2,600,354

COMPOSITION FOR FORMING FLEXIBLE MOLDING PATTERNS

John E. Wiss, Columbus, Ohio

No Drawing. Application February 15, 1950,
Serial No. 144,380

4 Claims. (Cl. 18—47)

The present invention relates to the art of mold making, and more specifically, to an improved composition for making flexible mold patterns. The present application is a continuation-in-part of my co-pending United States application, Serial Number 736,587, filed March 22, 1947, and entitled "Flexible Molding Pattern."

In the past, numerous attempts have been made to produce flexible mold patterns which possess sufficient dimensional stability and accuracy to permit of the casting of relatively intricate articles containing undercut cavities and relatively sharp outlines without in any way damaging the molded article or the mold upon subsequent separation of the two. The use applications of flexible molds are numerous, as the same may be employed as molding receptacles for various materials such as cementitious mixes, plaster mixes, ceramic mixes, and various thermosetting and/or thermoplastic synthetic resinous materials. Heretofore, it has been proposed to use as a material for forming flexible molds such compositions as rubber latex, glue gelatine or gels, alginates, hydrophylic colloids, and certain types of flexible synthetic resinous materials such as, for example, plasticized polymerized vinyl chlorides. However, through practice, it has been found that the above enumerated materials or compositions, while resulting in a flexible mold pattern, are subject to several important objections, foremost of which is the dimensional instability of the materials and the resultant shrinkage and contraction thereof during the setting or formation of the materials into molding patterns. Generally, materials of the aforementioned character are rendered dimensionally unstable by reason of the incorporation of occluded air, or of volatile plasticizers or liquids within the mold-forming material which, during the formation of the mold, and even after formation thereof, vaporize or are otherwise exhausted from the molding material to cause the same to shrink or contract and thereby become dimensionally inaccurate.

Further, compositions heretofore employed in the formation of flexible molds, particularly molds formed from various synthetic resinous compositions, generally required elevated temperatures to effect liquefaction of the material in a manner by which the same might be flowed or poured upon a workpiece to eventually reproduce a molding pattern therefrom, or additionally required the application of heat thereto to completely set or polymerize the composition. It will be manifest that when working with workpieces or original objects of a relatively fragile character, or workpieces having relatively low melting points, such elevated temperatures, required to liquefy and/or set the mold-forming material, would necessarily detrimentally affect the original workpiece or object from which the mold is cast. For instance, when it is desired to cast a mold from an original workpiece formed, for example, from wax or other relatively low melting point materials, elevated pouring temperatures within the mold-forming material tend to completely destroy the configuration of the original article with the result that it is impossible to obtain an accurate mold from workpieces of this nature. Although various cold-pouring materials, such as the alginates and certain hydrophylic colloids, have been used with some degree of success in the formation of mold patterns from relatively fragile or low melting point workpieces, these latter types of molding materials are subject to extremely high shrinkage due to the loss of water or other volatile materials contained in the material as plasticizing or liquefying agents to facilitate cold pouring and cold setting thereof.

Accordingly, it is the primary object of this invention to provide an improved material for forming flexible molding patterns which are characterized by an extremely high degree of dimensional accuracy and the fact that the molding material may be mixed, poured and set at ordinary room temperatures, thereby precluding the possibility of damage to the workpiece such as might be occasioned by the use of relatively elevated temperatures.

It is another object of the present invention to provide an improved flexible mold-forming material which is compounded from a plurality of stable liquid components, mixed as a liquid at ordinary room temperatures, poured or flowed over a workpiece at ordinary room temperatures, and allowed to set without application of heat or without requiring any further manipulative steps to produce a highly accurate and dimensionally stable flexible molding pattern characterized by its ability to withstand attack by ordinary solvents and operating temperatures up to approximately 300° F.

Yet another object of the present invention is to provide a flexible mold-forming material which may be poured and set at ordinary room temperatures after the manner of plaster of Paris, to produce a tough, yet flexible, tear-resistant negative mold whose molding surface, for all practical purposes, exactly reproduces the surface upon which the flexible mold is cast.

Still a further object of the present invention is to provide a flexible mold-forming material which is devoid of any fluid substances of a volatile nature, and which further may incorporate, as a component material, a suitable desiccating agent to absorb any water produced during the polymerization or chemical reaction of the various ingredients making up the mold-forming material during the formation of a flexible mold, in order that such material will not be subject to contraction or shrinkage, either during the formation of the mold pattern or thereafter under prolonged working conditions.

A further object of the present invention is to provide an improved flexible mold-forming material which may be easily and readily adhesively secured to various materials, such as plaster of Paris or wood, to provide a rigid non-flexible backing for the support of the finished flexible mold.

In accordance with the present invention, a relatively low molecular weight liquid olefin polysulfide-polymercaptan polymer is employed as the major component of the present mold-forming material. Such olefin polysulfide-polymercaptan polymer may advantageously be formed as the reaction product of an alkali metal polysulfide, such as sodium tetrasulfide, with an olefin or ethylene series compound, such as ethylene dichloride, or beta, beta' dichloroethyl formal. The liquid low molecular weight polymer may be described as an incompletely polymerized polymer having a plurality of reactive mercaptan terminals and side groups capable of further polymerization and cross-linkage. Thus, the polymer may be mixed with suitable polymerization catalysts to form a completely polymerized resiliently flexible thermosetting gel or rubber-like substance. Chemically, the liquid polysulfide-polymercaptan is a polymer having a molecular weight varying from approximately 500 to 12,000, having SH terminals, and generally comprised of units having the formula

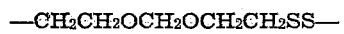
—CH₂CH₂OCH₂OCH₂CH₂SS—

This polymer is further characterized by its permanent stability with age in the absence of a polymerization catalyst. Preferably, the liquid polysulfide-polymercaptan polymer, which ordinarily comprises a relatively viscous liquid, is cut, or has its viscosity reduced, with a non-volatile plasticizer or solvent, such as dibutyl phthalate. In this connection, it has been found that a mixture of approximately 70 parts by weight of the liquid polymercaptan polymer with 30 parts by weight of dibutyl phthalate produces a desired room temperature viscosity satisfactory for subsequent mixing and pouring operations in the formation of flexible molds. Also, where it is desirable to retard the rate of polymerization of the liquid polysulfide-polymercaptan polymer during subsequent setting or molding operations, small amounts of a retarding agent, such as oleic acid, or similar higher fatty acids, preferably liquid fatty acids, may be added to the mixture of liquid polymer and dibutyl phthalate without in any way destroying age stability of the mixture, or adversely affecting the viscosity characteristics of the mixture.

The second basic component making up the present improved flexible mold-forming material comprises a polymerization catalyst in the form of a liquid mixture or suspension of an extremely finely divided and milled oxidizing agent, such as lead peroxide, zinc oxide with hexamethylenetetramine, zinc chromate, or furfural in a non-volatile liquid, such as dibutyl phthalate. To the liquid mixture or suspension of polymerization catalyst and non-volatile liquid may be added a suitable inert, soluble, non-volatile, liquid thickening agent for the purpose of increasing the viscosity of the polymerization catalyst mixture and to thereby slow the rate of settling of the finely divided particles of the oxidizing agent contained in the mixture. Thus, it will be seen that the second component of the present improved mold-forming material comprises a viscous syrupy liquid of paint-like consistency which is indefinitely age-stable over the entire range of ordinary room temperatures. In a preferred form, the second basic ingredient or mixture comprises approximately 40% by weight of lead peroxide and 60% by weight of non-volatile liquid consisting, in the main, of dibutyl phthalate and a relatively small amount of thickening fluid.

The third component making up the present improved flexible mold-forming material comprises a suspension of extremely finely divided and milled sulphur in dibutyl phthalate with a relatively small amount of a thickening or emulsifying agent employed to retard the settling of the sulphur particles out of solution or suspension in the dibutyl phthalate. Preferably, the third component comprises approximately 50% by weight of sulphur and 50% by weight of inert, non-volatile liquid.

Each of the components or factors making up the present improved liquid cold-flowing mold-forming material is permanently age-stable over the entire range of ordinary operating temperatures, and does not change in chemical or physical properties over long periods of time. Further, it is noted that each of the components is a liquid of paint-like consistency which may be separately admixed with the remaining components to produce a viscous liquid mixture which may be readily poured or vacuum flowed over a workpiece or pattern from which the ultimate flexible mold is to be formed.

In preparing flexible molding patterns from the above-mentioned components or factors, the mixture of lead peroxide and dibutyl phthalate is preferably poured into the mixture of liquid polymer and dibutyl phthalate, with or without an incorporated retarding agent, and thereafter, the third component, namely, the suspended sulphur in dibutyl phthalate, is also added to the mixture of the first and second components, at which time the three components are thoroughly mixed together, care being taken to incorporate the portions of the liquid material adhering to the walls of the mixing vessel, and thereafter, the entire mixture is poured or flowed over a suitably lubricated workpiece and permitted to remain in place on such workpiece at ordinary room temperatures until completely polymerized. After initial pouring of the admixed components upon the workpiece, the liquid mass initially flows into the undercuts and cavities of the workpiece, while at the same time exhausting occluded air bubbles from the upper surface of the liquid mass. Depending upon the amount of retarding agent employed in association with the liquid polymer, and the temperature at which the liquid is maintained, the mixture of components requires from five minutes to twenty-four hours to set or completely polymerize, whereupon a non-volatile, age-stable, tough, and chemically resistant flexible thermosetting mass or gel is obtained. The resulting flexible thermosetting gel may be easily parted from the workpiece to provide a mold face having substantially the exact configuration and dimensions of the workpiece from which the mold was taken. The dimensional accuracy of molds formed from the present mold-forming material is demonstrated by the fact that extremely accurate molds may be taken from engraving plates having differential dimensions of the order of 0.0001 of an inch. The dimensional accuracy obtained with the present flexible mold-forming material is attributed to the fact that such material is entirely devoid of any volatile or vaporizable material, and also to the fact that the liquid polymer is capable of complete polymerization with negligible shrinkage or contraction, while at the same time completely exhausting occluded air bubbles and voids occurring within the mixtuure during the mixing and milling of the various ingredients.

The following is a specific example of the various ingredients and the proportions by weight thereof and the method steps employed in the formulation of a flexible mold-forming material formed in accordance with the present invention:

100 parts of a liquid mixture, consisting of 70 parts by weight of a liquid olefin polymercaptan polymer having a molecular weight of approximately 5,000, 28 parts by weight of dibutyl phthalate, and 2 parts by weight of oleic acid, was admixed with 15 parts by weight of a liquid mixture consisting of 40% lead peroxide with 60% dibutyl phthalate. To this mixture was added 1.5 parts by weight of a liquid mixture or suspension consisting of 50% finely milled sulphur and 50% dibtuyl phthalate.

The three components were thoroughly mixed and blended together in a single container by hand stirring. The admixture of the various components above outlined produced a viscous fluid mass having a working time of approximately twenty minutes. After completely mixing the several components, the mixture was poured upon the surface of a workpiece containing numerous undercut cavities, such workpiece having been previously lubricated with a film of petrolatum. The liquid mixture, after pouring, readily exhausted air bubbles through the upper surface thereof, and was permitted to remain in situ at room temperatures upon the workpiece for a period of approximately four hours. During this time, the liquid polymer completely polymerized, resulting in a resiliently flexible, completely cured thermosetting mold pattern having a molding face corresponding to the exact dimensions and configuration of the outer surface of the workpiece upon which the liquid mixture was poured. The flexible mold was easily parted from the workpiece to form a negative molding cavity for the reception of such materials as plaster of Paris, cement, and various liquid resinous mixtures.

In certain instances, it has been found desirable to add to the liquid mold-forming material suitable amounts of reenforcing pigments, such as finely divided carbon black, zinc sulphide, iron oxides and anhydrous calcium sulphate. One or more of these reenforcing pigments may be added directly to the liquid polysulfide-polymercaptan polymer, or to the suspension or liquid mixture of sulphur and dibutyl phthalate. Such pigments may be added in amounts up to 100% by weight of the liquid polymer without adversely affecting the flow characteristics of the mold-forming mixture. The reenforcing pigments function to increase the toughness and tear-resistance of the finished flexible molds and may also function to vary the color of the finished molds. It has further been found that the addition of reenforcing pigments to either the liquid polymer component or the sulphur component in no way adversely affects the stability of such components, and the pigmented mixture retains its age stability indefinitely.

In view of the foregoing, it will be seen that the present invention provides a useful and efficient flexible mold-forming composition which is characterized by its ability to be mixed from separate age-staple liquid components, poured at room temperatures upon a mold pattern, and set or polymerized also at room temperatures to provide an extremely dimensionally accurate and permanently age-stable flexible mold pattern. Further, the use of such composition makes possible a simple and efficient method for the formation of flexible molds wherein a liquid mixture may be mixed, poured and set at ordinary room temperatures, after the manner of plaster of Paris, without requiring heat treatment and/or chemical treatment during the polymerization or setting operation.

I claim:

1. A liquid, room temperature setting flexible mold-forming material comprising an incompletely polymerized olefin polymercaptan polymer, a liquid suspension of lead peroxide in dibutyl phthalate, and a liquid suspension of sulphur in dibutyl phthalate.

2. A liquid composition for forming flexible mold patterns comprising an incompletely polymerized liquid olefin polymercaptan polymer, lead peroxide and finely divided sulphur.

3. A liquid composition for forming flexible mold patterns and characterized by its ability to be poured and set at ordinary room temperatures, comprising an incompletely polymerized liquid olefin polymercaptan polymer, lead peroxide, a retarding agent, and finely divided sulphur.

4. A liquid composition for forming flexible mold patterns and characterized by its ability to be poured and set at ordinary room temperatures, comprising an incompletely polymerized liquid olefin polymercaptan polymer, lead peroxide, a liquid higher fatty acid, and finely divided sulphur.

JOHN E. WISS.

REFERENCES CITED

The following references are of record in the file of this patent:

UNITED STATES PATENTS

| Number | Name | Date |
|---|---|---|
| 2,142,145 | Patrick | Jan. 3, 1939 |
| 2,402,528 | Bean | June 25, 1946 |
| 2,466,963 | Patrick | Apr. 12, 1949 |

OTHER REFERENCES

"Thiokol," Institute of Rubber Industry, vol. 18, June 1942, pp. 17-30.